W. F. GROENE.
COMBINED OIL BUSH AND FRICTION DEVICE.
APPLICATION FILED JAN. 22, 1910.

959,520.  Patented May 31, 1910.

Witnesses

Inventor
William F. Groene
By Robt. P. Hains
Attorney

UNITED STATES PATENT OFFICE.

WILLIAM F. GROENE, OF CINCINNATI, OHIO, ASSIGNOR TO R. K. LE BLOND MACHINE TOOL COMPANY, A CORPORATION OF OHIO.

COMBINED OIL-BUSH AND FRICTION DEVICE.

959,520.  Specification of Letters Patent.  Patented May 31, 1910.

Application filed January 22, 1910. Serial No. 539,530.

*To all whom it may concern:*

Be it known that I, WILLIAM F. GROENE, a citizen of the United States, residing at Cincinnati, in the county of Hamilton and State of Ohio, have invented certain new and useful Improvements in Combined Oil-Bushes and Friction Devices, of which the following is a full, clear, and exact specification.

This invention relates to clutch devices and the primary object is to provide an improved bushing with a clutch device, and means for connecting said clutch device and bushing whereby the bushing and the shaft to which it is keyed may be driven by the revolution of the clutch device.

A further object of the invention is to provide said bushing with an oil reservoir from which lubricant is fed to the hub of a loose pulley through a wick or strip of felt or like fabric, by capillary attraction.

The construction of the improvement will be fully described hereinafter in connection with the accompanying drawings which form a part of this specification, and its novel features will be set forth in the appended claims.

Figure 1:
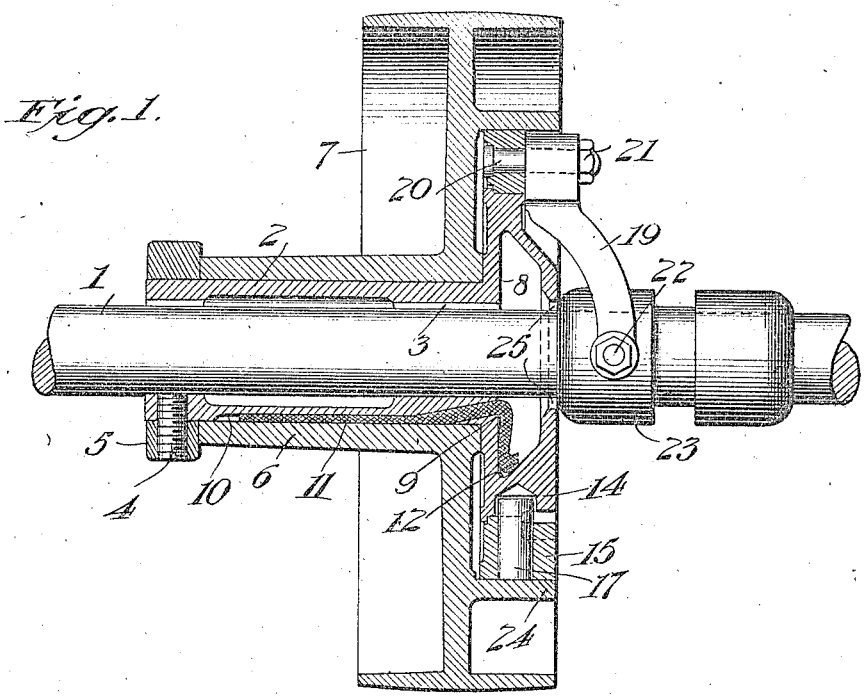
Figure 2:
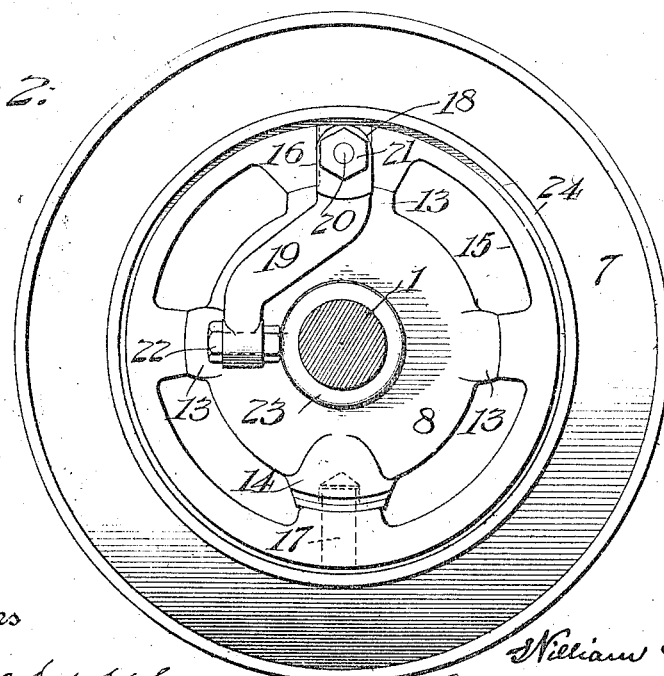

In the drawings: Figure 1 is an elevation of a shaft equipped with my improved lubricating and clutch devices, the latter being shown in section, and Fig. 2 is a front elevation of the pulley provided with my improvement, the shaft being shown in transverse section.

The reference numeral 1 designates a shaft to which is secured a bushing 2, by means of a key 3, and a set screw 4. A collar 5 surrounding one end of the bushing 2, and held by the set screw 4, serves as a stop for the hub 6 of a loose pulley 7. The opposite end of the bushing 2 is formed with an integral hollow head 8 serving as an oil reservoir.

The bushing is formed with an opening 9, and a groove 10 to receive a wick 11, one end 12 of which extends into the oil reservoir to take up the lubricant, and feed it by capillary attraction, to the inner surface of the hub of the pulley.

The oil reservoir 8 is provided with a plurality of external radial bosses 13, and 14 over which fits an expansible clamping ring 15 split at the point 16. A pin 17 extending through openings in the clamping ring and the boss 14 of the bushing connects the clamping ring to the bushing. The friction or clamping ring is recessed or cut away at the point 18, and to this recessed portion of the ring is pivotally secured a lever 19 by means of a pin 20 and nut 21.

The free end of the lever 19 carries an adjustable pin 22 adapted to be acted upon by a cone device 23 which cone device may be moved upon the shaft 1 by any suitable clutch lever to force the lever 19 outward from the shaft, thus causing the rounded pivoted end of the lever to force the split ends of ring apart to expand the ring into firm frictional contact with an annular flange 24 formed on the pulley 7.

The bosses 13 and 14 of the bushing form a bearing for the ring 15, and serve to center the latter when it is contracted to take all frictional strain from the pulley. The ring 15 is entirely separate from the bosses and is what is termed a "floating" friction.

The top of the lever 19 is milled on an exact radius from the pivot pin 20, so that it has a free movement on said pin, and at the same time always bears on the side of the friction ring, thus avoiding undue strain upon the pin.

The outer side of the oil reservoir is formed with an opening 25 of larger diameter than the shaft which passes through it, and through this opening oil may be readily supplied to the reservoir from an oil can.

The operation of the device will be readily understood from the foregoing description.

The cone 23 acts as a wedge between the pin 22 and the shaft, forcing the lever 19 outward and opening or expanding the friction ring 15 and clamping it firmly against the flange 24 of the pulley. This revolves the friction ring 15 and through the driving pin 17, the bushing is revolved the latter in turn revolving the shaft 1, the bushing being firmly keyed thereto.

Having thus fully described my invention, what I claim as new, and desire to secure by Letters Patent is:—

1. The combination with a shaft, of a bushing secured on said shaft, said bushing being formed with a hollow head serving as an oil reservoir and having an opening for the passage of the shaft, said opening being of greater diameter than the shaft to afford an inlet for oil, a plurality of external bosses on the bushing, a loose pulley revoluble on the bushing, a friction ring loosely supported on said bosses, and a connection between said ring and one of said bosses, whereby said boss and shaft will be revolved with the ring when the latter is clamped to said pulley.

2. The combination with a shaft, of a bushing secured thereon, and provided with an oil reservoir having a plurality of external bosses, a loose pulley revoluble on said bushing, a friction ring loosely supported on said bosses, and a connection between said ring and one of said bosses, whereby said boss and shaft will be revolved with the ring when the latter is clamped to said pulley.

3. The combination with a shaft, of a bushing secured thereon, and provided with an oil reservoir, a loose pulley revoluble on said bushing and an expansible clamping ring interposed between said reservoir and pulley, and connected to said reservoir.

4. The combination with a shaft, of a bushing secured thereon, and provided with an oil reservoir, a loose pulley revoluble on said bushing, a friction device surrounding said reservoir, and connected thereto, and means for expanding said friction device into clamping engagement with said pulley to revolve said bushing and shaft.

5. The combination with a shaft, of a bushing secured thereon, and provided with an oil reservoir, a loose pulley revoluble on said bushing, a friction device surrounding said reservoir, and connected thereto, and means for expanding said friction device into clamping engagement with said pulley to revolve said bushing and shaft, comprising a lever pivotally secured to said friction device, and a longitudinally movable device on said shaft for forcing said lever outward.

In testimony whereof I have signed my name to this specification in the presence of two witnesses.

WILLIAM F. GROENE.

Witnesses:
GRACE A. PUGH,
RICHD. K. LE BLOND.